United States Patent Office 2,976,202
Patented Mar. 21, 1961

2,976,202

METHOD OF BONDING SYNTHETIC HIGH POLYMERS TO POLYURETHANE ELASTOMERS

Samuel Salem and Donald W. Anderson, Akron, Ohio, assignors to The General Tire & Rubber Company, Akron, Ohio, a corporation of Ohio No Drawing. Filed July 27, 1956, Ser. No. 600,417

5 Claims. (Cl. 154—139)

This invention relates to an improved process for the bonding of textile fabrics, filament cords and the like to vulcanized polyurethane elastomer structures. More particularly this invention relates to methods of bonding synthetic linear high polymers such as polyamide or polyester filaments having a high melting point to flexible elastomers of polyurethanes.

Because polyurethane elastomers have exceptional properties such as high abrasion resistance, high resistance to tearing, high tensile strengths, high flex life and general ability to perform at elevated temperature, they are desirable for use in making tires, belts and the like. A strong adhesion between the tire cords and rubber is necessary to provide a satisfactory tire.

The poor adhesion of polyurethane rubber to synthetic fabrics such as nylon has been a serious obstacle to the use of polyurethane rubber in tires.

The present invention provides a method by which a high degree of adhesion can be obtained between synthetic fabrics such as nylon and polyurethane rubbers whereby tires of superior quality can be produced. Broadly, the invention comprises bonding synthetic fabrics of linear polyamides or polyesters having a relatively high melting point to a polyurethane elastomer by applying to the fabric an aqueous solution of a dihydroxy phenol and an aldehyde together with a resin-forming catalyst, drying the fabric, applying a polyurethane elastomer to the fabric as treated in the tire building process and curing.

It is an object of the present invention to provide a method of obtaining an improved bond between synthetic linear polyesters or polyamide filaments and a flexible elastomer comprising a reaction product of a polyisocyanate and a generally linear polyol selected from a member of the group consisting of polyethers and polyesters.

It is also an object to provide a method of securing a high degree of adhesion between a synthetic fabric composed of a material such as a linear, long chain polyamide and a polyurethane elastomer.

Other objects of this invention will be apparent from the description that follows and the appended claims.

In accordance with this invention, we have found that a high degree of adhesion between fabrics or cords formed from synthetic filaments of the characteristics above referred to and a polyurethane elastomer may be obtained by using a composition containing a heat-hardening resin to bond the fabric to the polyurethane elastomer.

Useful polyurethane elastomers are generally those which are flexible, generally linear, long chain reaction products of a polyol and a polyisocyanate. Generally the polyols used are linear polyesters or polyethers. Also, in order to provide polyesters of linear rubbery polymers of the solid non-porous type, the low acid number linear polyesters and polyethers are desirable. Polyesters with acid numbers of less than one give products which are superior, although we can, in accordance with the present invention, use polyesters with a much higher acid number, even to the range of an acid number of 60. The molecular weight of the polyesters should, for the preparation of rubbery polyurethane polymers, be above 500 and preferably above 1000. The maximum molecular weight of the polyester is dependent only upon the ability to economically make the polyesters of higher molecular weights, the higher melecular weights being preferred. Generally, it is exceedingly difficult to obtain polyesters with a molecular weight much above 3000 or 4000 without substantially higher costs.

Suitable polyesters are those containing methylene, ethylene and propylene groups. A useful polyester is one formed from the reaction of 6.7 mols of ethylene glycol, 3.3 mols of propylene glycol and 8.4 mols of adipic acid. The polyester preferably has a molecular weight of about 2000, an acid number under one and a viscosity of 500 cps. at 73° C.

The polyethers used for preparing the improved polyurethane compounds have a molecular weight of at least 600 and preferably more; if materials rubbery at normal temperatures are desired, molecular weights of over 1000 are preferred. When the molecular weight of the polyether used for reacting with the isocyanates is less than 500 or 600, the product, while plastic, is too rigid for application as rubbery base materials at ordinary temperatures.

More rigid polyurethanes may be produced by increasing the amount of crosslinking in the resultant polyurethane, for instance, by using a crosslinking agent, such as trimethylol propane or by using polyesters or polyethers of the crosslinking type.

The preferred polyethers for polyurethane elastomers are mixed poly (ethylene-propylene) ether glycols, and polytetramethylene ether glycol. Desirable properties for the polyethers are active methylene groups, a very low acid number or no acid number and hydroxyl groups on the ends of the molecular chain. All of these polyethers are obviously saturated, i.e. free of aliphatic chemical unsaturation.

Examples of suitable polyethers are from the class of polyalkylene ether glycols, such as polyethylene glycol, such as "Carbowax," having a molecular weight of about 1000, polytetramethylene ether glycol, polytrimethylene ether glycol, polyneopentylene ether glycol, polypentamethyl ether glycol, preferably having a molecular weight of above 600 and preferably of about 2000 to 4000 and mixed polyalkylene ether glycols such as poly (ethylene-propylene) ether glycols. All of the above glycols are obviously saturated, i.e. free of aliphatic chemical unsaturation.

Any readily reactive organic diisocyanate having two and only two readily reactive isocyanate groups may be used for reacting with the polyester or polyether, but those having both isocyanate groups of about equal reactivity are preferred for at least part of the total isocyanate present to facilitate growth of the polyurethane chains. Tri-functional isocyanates like tri-functional polyesters act as cross-linking agents and are undesirable in appreciable quantity unless one of the functional groups is relatively non-reactive.

Various diisocyanates are commercially available and the following is a partial list:

(1) Tolylene-2,4-diisocyanate
(2) p,p'-Diisocyanato diphenyl methane
(3) Naphthalene-1,5-diisocyanate
(4) Bi-tolylene diisocyanate
(5) Di-anisidine diisocyanate
(6) Paraphenylene diisocyanate
(7) Metaphenylene diisocyanate
(8) Meta xylylene diisocyanate
(9) Benzidine diisocyanate All of the above diisocyanates are obviously free of aliphatic chemical unsaturation.

The quantities of diisocyanates and polyesters or polyethers when used in accordance with this invention should be close to a one-to-one molar ratio for best results. When used in this ratio, the resulting polyurethanes have good stability and may be milled and stored indefinitely. Evidence of slight cure or set up can sometimes be observed at very slight excess diisocyanate over the 1:1 molar ratio of diisocyanate to the polyester or polyether but the one-to-one molar ratio is the most desirable.

The methods of the present invention are particularly well suited for the treatment of synthetic fibers such as nylon and Dacron. Dacron is an oriented fiber of a polyester formed from ethylene glycol and terephthalic acid (polyethylene terephthalate fiber oriented along the fiber axis). Nylon is usually considered to be an oriented fiber of long-chain linear polymeric amides, such as hexamethylene diamine and adipic acid (polyhexamethylene adipamide or type 66 nylon), but also can be considered as an oriented fiber of polycaprolactam which is commonly called Perlon or type 6 nylon. The term "nylon" may therefore be construed to include both hexamethylene adipamide and polycaprolactam whenever employed in this application.

The resin-forming materials in the treating composition may be a phenolic compound and an organic aldehyde. The resin-forming materials are preferably used with a resin-forming or condensation catalyst which is preferably a basic catalyst such as the hydroxides and sulfites of sodium, potassium and ammonia. The resins produced are generally of the general class of heat-hardening aldehyde resin formed from phenolic compounds and aldehydes which are both preferably soluble in water to about ½% to 10% by weight. These resins should then polymerize or set up rapidly into an insoluble form at temperatures of about 250 to 300° F. or less.

A preferred phenolic compound is a resorcinol although other polyhydroxy phenols are suitable such as those having the hydroxyl groups in the benzene nucleus at a position meta with respect to each other including a resorcinol and orcinol. It is preferred that the proportion of the phenolic compound in the treating solution be about ½% to 5% by weight.

A preferred aldehyde is formaldehyde although other aldehydes may be substituted for the formaldehyde in whole or part such as acetaldehyde and furfural. It is preferred that the aldehyde be used in a slight molar excess over that actually required to react with the phenol so that all of the phenolic compound will be reacted so as to eliminate any danger of any excess phenol altering the curing step.

The condensation catalyst is preferably a basic catalyst such as sodium hydroxide, potassium hydroxide, ammonium hydroxide, or sulfites of sodium, potassium and ammonia or mixtures thereof. The percentage of catalyst used is generally about 0.2 to 10 percent by weight based on the weight of the resin forming materials.

It is understood that the time and temperature factors relating to drying the treated fabric or curing the elastomer may be varied from that ordinarily used in the manufacture of tires and belting in order to obtain substantial polymerization of slower reacting resin forming materials that may be used in the treating composition.

The fabric may be treated so as to apply the treating composition in any satisfactory manner such as passing the fabric or cord through a bath of resorcinol and formaldehyde, with a condensation catalyst and then passing the fabric through two doctor knives or squeeze rolls to remove the excess treating composition from the fabric and thereafter passing the fabric over a series of dryer rolls at a high enough temperature to dry the fabric and polymerize the resin. Generally the drying process at some stage raises the fabric temperature to about 80° C. to about 100° C. to insure a substantial polymerization of the resin-forming materials. Other methods suitable for applying the treating composition to the fabric may be used such as employing transfer rolls, spraying, brushing and the like. If desired, the cord may be dipped in a water bath before being dipped in the resorcinol-formaldehyde bath. The pre-dip of water wets the cord and tends to decrease the amount of resorcinol formaldehyde pick-up.

The drying of the treated fabric or cord may be accomplished in other ways such as carrying the treated cord by means of a belt or frame through a heated closed chamber.

When a cord treated in accordance with the present invention is dried and plied upon a compounded flexible polyurethane elastomer such as may be used advantageously in the manufacture of tires and the whole mass is cured at a curing temperature so as to cure the polyurethane stock completely, the bond between the polyurethane rubber and the treated cord is found to be of a high degree. When an "H" single cord adhesion test is conducted on a fabric and polyurethane rubber bonded according to the present novel methods, adhesion between the cord and rubber, in some cases, is found even to exceed the cord strength itself.

The method of the present invention effects a high degree of adhesion between the nylon cord and polyurethane rubber in tires and other articles. Also, natural nylon fabric bonded to a polyurethane elastomer as herein described, while not only exhibiting unusual adhesion, undergoes no marked decrease of fatigue resistance properties.

That the method of the present invention produces a superior bond between polyurethane elastomers and fabrics of the nylon type is shown by the series of tests described below:

A 0.045 gauge sheet of polyurethane rubber elastomer was made from the reaction product of about 1 mole of polyethylene propylene adipate and about 1 mole of p.p'-diisocyanato-diphenyl methane compounded with carbon black. Inasmuch as both the adipate and the diisocyanate are free of aliphatic chemical unsaturation, the polyurethane elastomer produced therefrom is obviously free of aliphatic chemical unsaturation. The surface of the polyurethane sheet was treated with dimethyl formamide to provide a clean surface for subsequent bonding to a fabric. Nylon cords were treated by dipping each of the various aqueous solutions of resorcinol formaldehyde containing a catalyst as indicated in Table I.

TABLE I

| Ingredients | Parts by Weight | | | | |
|---|---|---|---|---|---|
| | A | B | C | D | E |
| Smooth rubber latex (75/25 butadiene/vinyl pyridine) | 100 | 25 | None | None | None |
| Phenolic compound (Resorcinol) | 11 | 11 | 11 | 11 | 11 |
| Aldehyde (Formaldehyde) | 6 | 6 | 6 | 6 | 9 |
| Catalyst: (Sodium hydroxide) | 0.3 | 0.3 | 0.3 | 0.3 | 0.3 |
| Total Solids (Percent by weight) | 20 | 10 | 5 | 2.5 | 5 |
| Water content by weight | 80 | 90 | 95 | 97.5 | 95 |

The treated nylon cords were dried at a temperature of 350 to 450° F. for about 20 to 30 seconds. The cords were plied with the polyurethane elastomer previously described by calendering and the plied structure was further bonded by curing for about 20 to 60 minutes at about 50 pounds' steam pressure in test-specimen molds at an elevated temperature sufficient to vulcanize the rubber which is preferably about 250 to 350° F.

The resultant cured samples were made so as to be adaptable to the "H" single cord adhesion test.

Data was taken from adhesions which were pulled at room temperature and 100° C. as shown in Table II.

TABLE II

*Table of results*

| Sample No. | "H" Adhesion—lbs. | |
| --- | --- | --- |
| | Room Temperature | 100° C. |
| A | 17.2 | 13.8 |
| B | 19.8 | 15.3 |
| C | ¹ 26.5 | 23.4 |
| D | 25.1 | 22.9 |
| E | 24.8 | 23.0 |

¹ Indicates that a cord break occurred before an adhesive bond break.

As seen from the Table of Results, the adhesion of polyurethane rubber to treated nylon cords in accordance with the present invention is of an unusual high degree. Unexpectedly, cord treating solutions containing an aldehyde heat hardening resin alone provides a much stronger bond between synthetic cords and polyurethane rubber than solutions containing a rubber latex.

It is important to note that at room temperature, the cord fails generally at about 26 to 28 pounds and in one case the cord break occurred before bond failure. The "H" adhesion value of a nylon cord with no adhesive is only about 10 pounds. The excellent performance of samples at elevated temperatures is also important. As noted in Table II, samples C, D, and E treated by the methods of this invention exhibit high "H" adhesion values of about 23 pounds and even better at 100° C.

Instead of drying the cord at elevated temperatures, the cord or fabric may be dried even at room temperature or slightly above, and then subsequently vulcanized at elevated temperatures after being plied with the polyurethane elastomer.

It is obvious that many changes and modifications of the invention can be made within the nature and spirit thereof. It is therefore to be understood that the invention thereto is not limited except as set forth in the appended claims.

Having described our invention, we claim:

1. The process of bonding a fabric comprising filaments of an oriented synthetic linear polymer having a high melting point and selected from the group consisting of polyesters and polyamides to an elastomer, free of aliphatic chemical unsaturation, of the reaction product of a generally linear long chain polyhydroxyl-containing polymer selected from the group consisting of polyesters and polyethers and a diisocyanate which comprises the steps of forming a coating on the fabric composed essentially of an infusible insoluble resin by applying to the fabric an aqueous solution consisting essentially of a polyhydroxy phenol and an organic aldehyde and heating the fabric to form the infusible insoluble resin, and thereafter applying the elastomer under pressure to the fabric, said elastomer being free of olefinic unsaturation.

2. The process of bonding a fabric comprising filaments of an oriented synthetic linear polymer having a high melting point and selected from the group consisting of polyesters and polyamides to a rubbery polyurethane elastomer, free of aliphatic chemical unsaturation, which comprises the steps of forming a coating on the fabric comprised essentially of an infusible insoluble resin by applying to the fabric an aqueous solution consisting essentially of a dihydroxy phenol and an organic aldehyde and drying the fabric, and thereafter applying the elastomer under pressure to the fabric, said polyurethane elastomer being aliphatically saturated.

3. The process of bonding a fabric of a long chain polyamide having a high melting point to a flexible generally linear elastomeric reaction product, free of aliphatic chemical unsaturation, of about 1 mole of a generally linear long chain polyhydroxyl-containing polymer selected from the group consisting of polyesters and polyethers, and about 1 mole of an organic diisocyanate, comprising the steps of forming a coating on the fabric composed essentially of an infusible insoluble resin by dipping the fabric in an aqueous solution consisting essentially of resorcinol and formaldehyde and with a small amount of a condensation catalyst and drying the fabric, cleaning the elastomer with an organic solvent to provide a clean surface for bonding, calendering the fabric to the elastomer, and thereafter subjecting the fabric and elastomer to a curing temperature, said elastomeric reaction product being free of aliphatic unsaturation.

4. The process of bonding a fabric of a long chain reaction product of adipic acid and hexamethylene diamine to a flexible generally linear polyurethane elastomer, free of aliphatic chemical unsaturation, comprising the steps of forming a coating on the fabric composed essentially of an infusible insoluble resin by dipping the fabric in a aqueous solution consisting essentially of resorcinol and formaldehyde with a small amount of a condensation catalyst and drying the fabric, cleaning the elastomer with an organic solvent to provide a clean surface for bonding, calendering the fabric to the elastomer, and thereafter subjecting the fabric and elastomer to a curing temperature, said polyurethane elastomer being aliphatically saturated.

5. The process of bonding a fabric of a long chain polyamide having a high melting point to a flexible elastomeric reaction product, free of aliphatic chemical unsaturation, of about 1 mole of a generally linear long chain polyhydroxyl-containing polymer selected from the group consisting of polyesters and polyethers, and about 1 mole of an organic diisocyanate, comprising the steps of forming a coating on the fabric composed essentially of an infusible insoluble resin by applying to the fabric an aqueous solution consisting essentially of dihydroxy phenol and sufficient formaldehyde to form an insoluble resin together with a resin-forming catalyst and heating the fabric sufficiently to convert at least a porttion of the phenol and formaldehyde to form an insoluble resin, cleaning the elastomer with an organic solvent to provide a clean surface for bonding, calendering the fabric to the elastomer, and thereafter subjecting the fabric and elastomer to a curing temperature, said elastomer reaction product being free of olefinic unsaturation.

References Cited in the file of this patent

UNITED STATES PATENTS

| | | |
| --- | --- | --- |
| 2,422,271 | Vaala et al. | June 17, 1947 |
| 2,424,885 | Buist et al. | July 29, 1947 |
| 2,444,094 | Duggan | June 29, 1948 |
| 2,639,252 | Simon et al. | May 19, 1953 |
| 2,642,920 | Simon et al. | June 23, 1953 |
| 2,691,614 | Wilson | Oct. 12, 1954 |
| 2,713,884 | Schwartz | July 26, 1955 |
| 2,746,898 | Buckwalter et al. | May 22, 1956 |
| 2,748,049 | Kalafus | May 29, 1956 |
| 2,749,960 | Schwartz | June 12, 1956 |
| 2,766,164 | Salem | Oct. 9, 1956 |
| 2,822,311 | Rowe et al. | Feb. 4, 1958 |